United States Patent
Bowman et al.

(10) Patent No.: US 6,254,193 B1
(45) Date of Patent: Jul. 3, 2001

(54) DUAL WHEEL ASSEMBLY DIFFERENTIAL

(75) Inventors: Larry W. Bowman, Troy; Patrick D. Laper, Rochester; Richard M. Clisch, Canton; Raji S. El-Kassouf, Sterling Heights; Michael G. Semke, Novi; Gary P. Ford, St. Joseph, all of MI (US); Joseph B. Saxon, Cookeville, TN (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/590,450

(22) Filed: Jun. 9, 2000

(51) Int. Cl.$^7$ ..................................................... B60B 11/02
(52) U.S. Cl. .......................... 301/36.2; 180/371; 475/221
(58) Field of Search .................... 301/36.1, 36.2, 301/105.1, 124.1; 180/371, 372; 475/204, 221

(56) References Cited

U.S. PATENT DOCUMENTS

| | | | |
|---|---|---|---|
| 1,919,925 | * 7/1933 | Blakeslee | 180/371 |
| 1,979,598 | 11/1934 | Ash . | |
| 1,994,719 | * 3/1935 | Lichty | 301/36.2 X |
| 2,126,960 | 8/1938 | Higbee . | |
| 2,135,568 | * 11/1938 | Durham et al. | 301/36.2 |
| 2,243,181 | * 5/1941 | Altemus | 301/36.2 |
| 2,267,362 | * 12/1941 | Ash | 301/36.2 |
| 2,298,334 | 10/1942 | Ash . | |
| 2,305,836 | * 12/1942 | Ash | 301/36.2 |
| 2,386,917 | * 10/1945 | Thornton | 180/371 |
| 2,389,339 | 11/1945 | Ash . | |
| 3,770,074 | * 11/1973 | Sherman | 180/372 |

* cited by examiner

*Primary Examiner*—Russell D. Stormer
(74) *Attorney, Agent, or Firm*—Carlson, Gaskey & Olds, P.C.

(57) ABSTRACT

A dual wheel assembly is provided that includes a spindle having an axle shaft defining a rotational axis. The axle shaft has a drive pinion. A first wheel hub is supported on the spindle and is positioned to be rotatably driven about the rotational axis. A second wheel hub is arranged adjacent to the first wheel hub and is also rotatable about the rotational axis. The second wheel hub may be supported by the first wheel hub or the spindle. A differential assembly is interconnected between the first wheel hub and the second wheel hub. The differential assembly permits both wheels to be driven for increased traction while allowing the second wheel hub to rotate relative to the first wheel hub. A gear reduction assembly interconnects the differential assembly and the drive pinion to provide torque multiplication to the wheel hubs. In this manner, the gear reduction assembly provides the additional torque required for heavy vehicles while the differential assembly allows relative rotation of the wheel hubs.

6 Claims, 1 Drawing Sheet

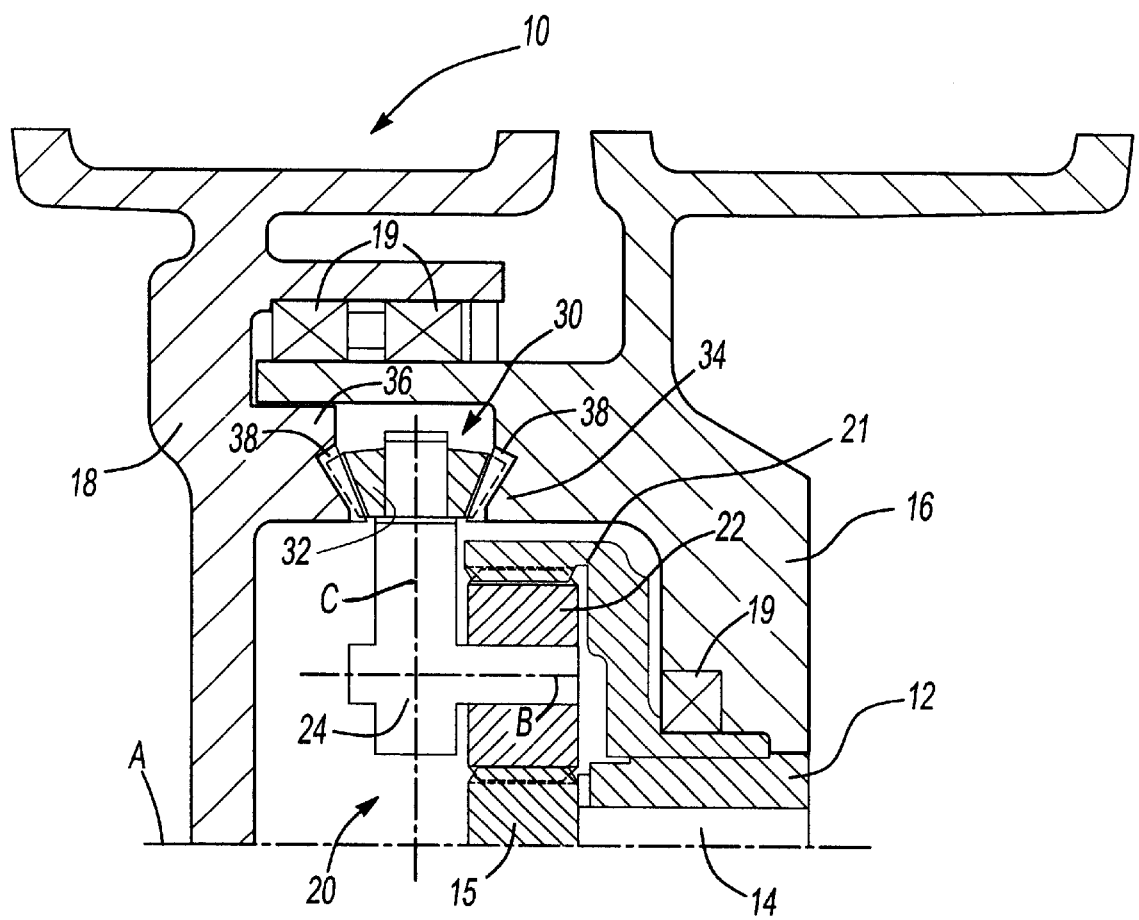

DUAL WHEEL ASSEMBLY DIFFERENTIAL

BACKGROUND OF THE INVENTION

This invention relates to an axle assembly having multiple wheels at each end of an axle in which one wheel is permitted to rotate relative to the other wheel, and more specifically, the invention relates to a differential interconnecting the wheels for heavy duty vehicles requiring a gear reduction assembly.

Axle assemblies having dual wheels on either end of the axle have been used to increase the load bearing capability of heavy duty vehicles. Typically the pair of wheels on each end of the axle assembly is secured together so that they rotate together about an axis. Some heavy duty vehicles, such as lift trucks, undergo numerous turning maneuvers which wear the tires significantly. The tire wear is caused when the tires scrub, or drag, since the wheels that are secured together must travel different distances at the inside and outside of the turning radius. Tire wear and maintenance on heavy duty lift trucks due to scrub cost thousands of dollars annually per vehicle.

Dual wheel assembly designs have been proposed that permit the wheels to rotate relative to one another to reduce scrubbing during vehicle turns while driving at least one of the wheels to propel the vehicle. Certain driving conditions require that both wheels be driven to provide enough traction to propel the vehicle and its load. Some designs have been developed which utilize a differential gear set between the wheels so that both wheels may be driven at the same rate when the vehicle travels a straight path. The differential permits the wheels to rotate relative to one another when the vehicle travels a curved path to reduce scrubbing. Heavy duty vehicles, such as lift trucks, typically require a gear reduction assembly, or final drive, between the drive axle and each drive wheel to produce sufficient torque to propel the vehicle and its load. However, the prior art does not address the need of developing a differential assembly for use with a final drive. Therefore, what is needed is a dual wheel assembly that incorporates a differential with a final drive for maintaining desire traction and torque multiplication while reducing tire scrub.

SUMMARY OF THE INVENTION AND ADVANTAGES

The present invention provides a dual wheel assembly that includes a spindle having an axle shaft defining a rotational axis. The axle shaft has a drive pinion. A first wheel hub is supported on the spindle and is positioned to be rotatably driven about the rotational axis. A second wheel hub is arranged adjacent to the first wheel hub and is also rotatable about the rotational axis. The second wheel hub may be supported by the first wheel hub or the spindle. A differential assembly is interconnected between the first wheel hub and the second wheel hub. The differential assembly permits both wheels to be driven for increase traction while allowing the second wheel hub to rotate relative to the first wheel hub. A gear reduction assembly interconnects the differential assembly and the drive pinion to provide torque multiplication to the wheel hubs. In this manner, the gear reduction assembly provides the additional torque required for heavy vehicles while the differential assembly allows relative rotation of the wheel axis.

Accordingly, the above inventions provide is a dual wheel assembly that incorporates a differential with a final drive for maintaining desire traction and torque multiplication while reducing tire scrub.

BRIEF DESCRIPTION OF THE DRAWINGS

Other advantages of the present invention can be understood by reference to the following detailed description when considered in connection with the accompanying drawings wherein the FIGURE is a cross-sectional view of a dual wheel assembly of the present invention.

DETAILED DESCRIPTION OF THE PREFERRED EMBODIMENT

The present invention dual wheel assemblies 10 shown in the FIGURE is adapted for use with heavy vehicles. It is to be understood the FIGURE is somewhat schematic. Heavy vehicles, such as lift trucks, require very high torque at the wheels to propel the vehicle and its load. These heavy vehicles also utilize rather large tires having a wide footprint that tend to scrub severely during sharp turns.

The dual wheel assembly 10 of the present invention includes a spindle 12 having an axle shaft 14 disposed therein that defines a rotational axis A. The axle shaft 14 has a drive pinion 15 that is splined thereto. A first wheel hub 16 is supported on the spindle 12 for rotation about axis A. A second wheel hub 18 is adjacent to the first wheel hub 16 and is rotatable about axis A. The second wheel hub 18 may be supported by the spindle 12 or some other component in the dual wheel assembly 10 such as a portion of the first wheel hub 16, as shown in the FIGURE. Bearing assemblies 19 support the wheel hubs 16, 18 in any suitable manner.

The dual wheel assembly 10 incorporates a gear reduction assembly 20, preferably a planetary gear set, to provide the increased torque needed for heavy applications. A ring gear 21 is arranged about the pinion 15 and splined against rotation to the spindle 12. The ring gear 21 is retained on the spindle 12 in a manner known in the art. In the embodiment shown, the gear reduction assembly 20 includes planetary gears 22 supported by a planetary spider 24 and rotatable about an axis B. The planetary gears 22 mesh with the ring gear 21 and pinion 15 so that as the pinion 15 drives the planetary gears 22, the planetary spider 24 is driven about axis A. In this manner, torque multiplication is provided to the wheel hubs 16 and 18. However, it is e understood that other gear reductions assembly may be used with the present invention.

A differential assembly 30 interconnects the first 16 and second 18 wheel hubs to drive the second hub 18 together with the first hub 16. The differential assembly 30 also permits relative rotation between the hubs 16, 18 during vehicle turns. The differential assembly 30 includes a bevel gear 32 supported on the planetary spider 24 and rotatable about an axis C, which is transverse to axis B. The hubs 16, 18 respectively include portions 34, 36 each with teeth 38 that face one another. The bevel gear 32 is arranged between the hubs 16, 18 for engagement with the teeth 38. As the vehicle travels in a straight path, the planetary spider 24 drives the hubs 16, 18 through bevel gear 32 and, as a result, the hubs 16, 18 rotate in unison. If the vehicle turns, differential assembly 30 will permit hubs 16 and 18 to rotate relative to one another.

The invention has been described in an illustrative manner, and it is to be understood that the terminology that has been used is intended to be in the nature of words of description rather than of limitation. Obviously, many modifications and variations of the present invention are possible in light of the above teachings. For example, the components may be rearranged in a manner other that shown in the Figures. It is, therefore, to be understood that within the scope of the appended claims the invention may be practiced otherwise than as specifically described.

what is claimed is:

1. A dual wheel assembly for a heavy vehicle, said assembly comprising:
    a spindle having an axle shaft defining a rotational axis, said axle shaft having a drive pinion;
    a first wheel hub supported on said spindle and interconnected to said axle shaft for being rotatably driven about said rotational axis;
    a second wheel hub adjacent to said first wheel hub, said second wheel hub being rotatable about said rotational axis; and
    a differential assembly interconnecting said first wheel hub and said second wheel hub for permitting relative rotation between said wheel hubs when the vehicle travels a curved path; and
    a gear reduction assembly interconnecting said differential assembly and said drive pinion for providing torque multiplication to said wheel hubs when being driven by said axle shaft.

2. The assembly according to claim 1, wherein said gear reduction assembly further comprises a planetary gear assembly interconnecting said drive pinion and said differential assembly.

3. The assembly according to claim 2, wherein said planetary gear assembly includes planetary gears interposed between and engaged with said drive pinion and a ring gear.

4. The assembly according to claim 3, wherein said planetary gears are supported by a planetary spider that is grounded to said spindle.

5. The assembly according to claim 4, wherein said differential assembly includes a differential gear supported on said planetary spider transverse to said rotational axis, and wheel hubs include teeth for engagement with said differential gear.

6. The mechanism according to claim 5, wherein said differential gear comprises a bevel gear.

* * * * *